United States Patent [19]

Gray et al.

[11] Patent Number: 4,896,843

[45] Date of Patent: Jan. 30, 1990

[54] COMFORT MECHANISM WITH SLACK LIMIT

[75] Inventors: Mark Gray, Newmarket; Ken Forget, La Fontaine, both of Canada

[73] Assignee: TRW Vehicle Safety Systems Ltd., Toronto, Canada

[21] Appl. No.: 238,856

[22] Filed: Aug. 31, 1988

[51] Int. Cl.⁴ .............................................. B60R 22/34
[52] U.S. Cl. .................................................. 242/107.7
[58] Field of Search ............. 242/107.6, 107.7, 107.12; 280/807; 297/475–478

[56] References Cited

U.S. PATENT DOCUMENTS

| | | | |
|---|---|---|---|
| 4,002,311 | 1/1977 | Fisher et al. | 242/107.7 |
| 4,023,746 | 5/1977 | Mugyar | 242/107.7 |
| 4,198,011 | 4/1980 | Kamijo et al. | 242/107.7 |
| 4,467,982 | 8/1984 | Tajima et al. | 242/107.6 |
| 4,540,137 | 9/1985 | Rogers, Jr. et al. | 242/107.7 X |
| 4,721,269 | 1/1988 | Gulette et al. | 242/107.7 |

Primary Examiner—John M. Jillions
Attorney, Agent, or Firm—Tarolli, Sundheim & Covell

[57] ABSTRACT

A seat belt retractor includes a spindle having belt webbing wound thereon. The spindle is supported for rotation in belt retraction and belt withdrawal directions. The spindle is biased to rotate in the belt retraction direction. A disk member is fixed to the spindle to rotate with the spindle. A rotatable drum member is adjacent the disk member. An interconnecting member is associated with the disk member and the drum member to effect rotation of the drum member with the disk member in the belt retraction direction. A selectively actuatable lock mechanism, when actuated, limits rotation of the drum member in the belt withdrawal direction to a predetermined amount of rotation and thereafter prevents rotation of the drum member in the belt withdrawal and belt retraction directions. The interconnecting member is attached to the drum member and is engageable with a stop portion on the disk member to block rotation of the disk member and the spindle in the belt retraction direction when the second member is blocked from rotating by the lock mechanism.

18 Claims, 6 Drawing Sheets

COMFORT MECHANISM WITH SLACK LIMIT

BACKGROUND OF THE INVENTION

1. Technical Field

The present invention relates to a seat belt retractor and, in particular, the present invention relates to a seat belt retractor having a comfort mechanism.

2. Description of the Prior Art

Comfort mechanisms for seat belt retractors are known. U.S. Pat. No. 4,467,982 discloses a comfort mechanism which is actuated after the belt wearer establishes a desired amount of slack in the belt webbing. The comfort mechanism, when actuated, blocks rotation of a seat belt retractor take-up spool in a belt retraction direction. Thus, the biasing force exerted by a wind-up spring tending to rotate the take-up spool in a belt retraction direction is not transferred through the seat belt webbing to the belt wearer.

U.S. Pat. application Ser. No. 138,838, filed Dec. 28, 1987 now U.S. Pat. No. 4,840,324 and assigned to the assignee of the present invention, discloses a comfort mechanism which establishes slack in belt webbing during actuation of the comfort mechanism. The comfort mechanism includes a drum with a plurality of ratchet teeth extending from the drum. The drum is connectable with a spindle of the retractor. A lever is moved to engage one of the ratchet teeth on the drum and rotate the drum a predetermined amount. Rotation of the drum causes the spindle to rotate in a belt withdrawal direction to establish a predetermined amount of slack in the belt webbing. The lever then blocks the drum and spindle from rotating in a belt retraction direction to maintain the slack in the belt webbing.

SUMMARY OF THE INVENTION

The present invention is directed to a seat belt retractor having a comfort mechanism which limits the amount of slack that can be established in the seat belt webbing. The comfort mechanism then maintains the slack in the belt webbing and permits withdrawal of the belt webbing in excess of the slack. The comfort mechanism re-establishes the slack in the belt webbing upon retraction of any belt webbing which may have been withdrawn in excess of the slack.

The seat belt retractor embodying the present invention comprises a spindle supported by a retractor frame for rotation in belt retraction and belt withdrawal directions. Belt webbing is wound onto the spindle. A wind-up spring biases the spindle to rotate in the belt retraction direction. A disk member is fixed to the spindle for rotation with the spindle. A rotatable drum member is located adjacent the disk member and is rotatable with the spindle in the belt withdrawal direction. A lock mechanism is actuatable to stop rotation of the drum member in the belt withdrawal direction at a predetermined angular position. The lock mechanism, thereafter, blocks rotation of the drum member in the belt withdrawal and belt retraction directions. The spindle and disk member may rotate in the belt withdrawal direction relative to the drum member from the predetermined angular position. A follower is attached to the drum member and is engageable with a stop portion of the disk member to block rotation of the disk member and the spindle in the belt retraction direction past the angular position when the drum member is blocked from rotating by the lock mechanism.

The drum member has a cylindrical outer surface and is located coaxially of the spindle. A groove is located in the outer surface of the drum member and extends transversely to the longitudinal central axis of the drum member. The lock mechanism includes a locking arm having a portion which is movable into engagement with the outer surface of the drum member and is receivable in the groove. The portion of the locking arm is engageable with a surface defining an end of the groove to stop rotation of the drum member in the belt withdrawal direction. An opening is located in the drum adjacent the surface defining the end of the groove. The opening receives the portion of the locking arm to block rotation of the drum member in the belt withdrawal and belt retraction directions.

The disk member is located coaxially within the drum member. A spiral groove is located in an axial end surface of the disk member. The follower is pivotally supported by the drum member and has a portion which is receivable in the spiral groove. The portion of the follower is engageable with a surface defining an end of the spiral groove to block rotation of the disk member and the spindle in the belt retraction direction relative to the drum member.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT

Figure 1:
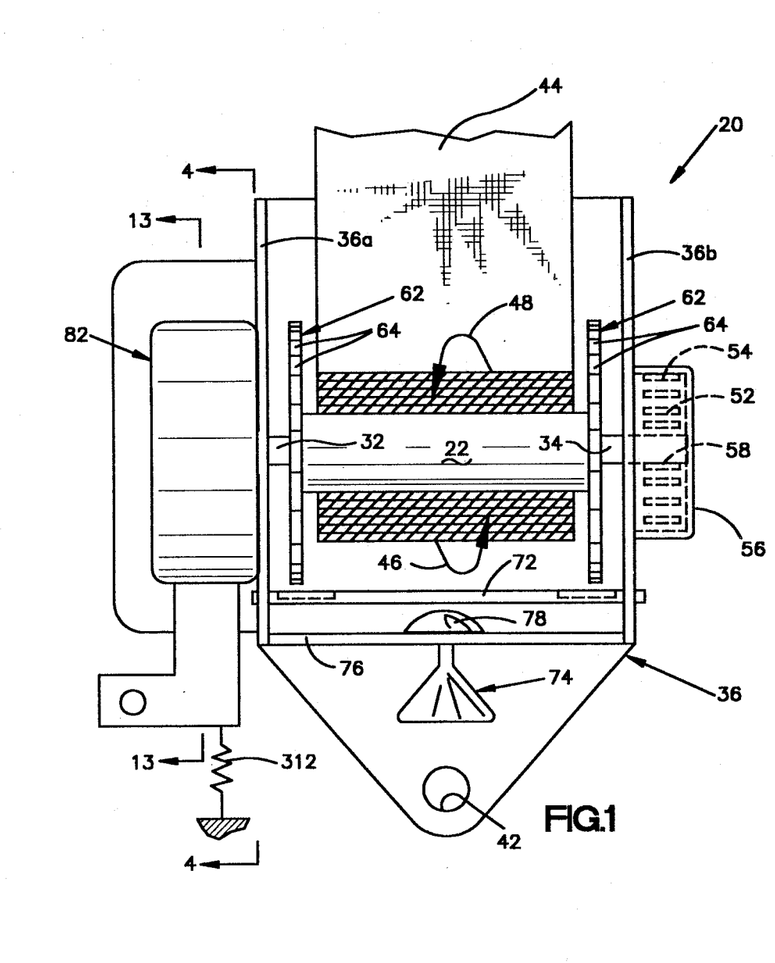
FIG. 1 is a view of a seat belt retractor having a comfort mechanism embodying the present invention.

A seat belt retractor 20 for use in an automotive vehicle is illustrated in FIG. 1. The seat belt retractor 20 includes a spindle 22. A pair of stub shafts 32, 34 are connected to and extend from axially opposite ends of the spindle 22. Each of the stub shafts 32, 34 is received in an opening in a respective side 36a, 36b of a frame 36 to support the spindle 22 for rotation An opening 42 in the frame 36 receives a fastener (not shown) to connect the retractor 20 to the vehicle.

Seat belt webbing 44 is connected at one end to the spindle 22 and is wound on the spindle for storage. The belt webbing 44 is extendable about an occupant of the vehicle for restraining the occupant during an emergency. The spindle 22 is rotatable in a belt retraction direction 46 and a belt withdrawal direction 48. A wind-up spring 52 has one end portion 54 connected to a spring cover 56 which is attached to the frame side 36b. Another end portion 58 of the wind-up spring 52 is connected to the stub shaft 34. The wind-up spring 52 biases the spindle 22 to rotate in the belt retraction direction 46 which tends to pull the belt webbing 44 against the vehicle occupant A pair of ratchet wheels 62 are connected to axially opposite end portions of the spindle 22 adjacent each frame side 36a, 36b. A plurality of ratchet teeth 64 extend radially outwardly from each of the ratchet wheels 62 and are equally spaced about the outer circumference of the ratchet wheel. A pawl 72 extends between and is supported for pivotal movement by the sides 36a, 36b of the frame 36. A pendulum-type inertia member 74 is supported for pivotal movement by a beam 76 extending between the sides 36a, 36b of the frame 36 adjacent the pawl 72. The inertia member 74 pivots relative to the beam 76 in response to acceleration or deceleration of the vehicle at a rate above a predetermined rate, as is known.

Upon pivotal movement of the inertia member 74, an upper portion 78 of the inertia member engages the pawl 72 and pivots the pawl toward the ratchet wheels 62. The pawl 72 engages a ratchet tooth 64 on each of the ratchet wheels 62 to block the spindle 22 from rotating in the belt withdrawal direction 48. While a vehicle sensitive type locking mechanism is described, it should be apparent that any known type of locking mechanism may be used to block rotation of the spindle 22 in the belt withdrawal direction 48 during an emergency.

Figure 2:
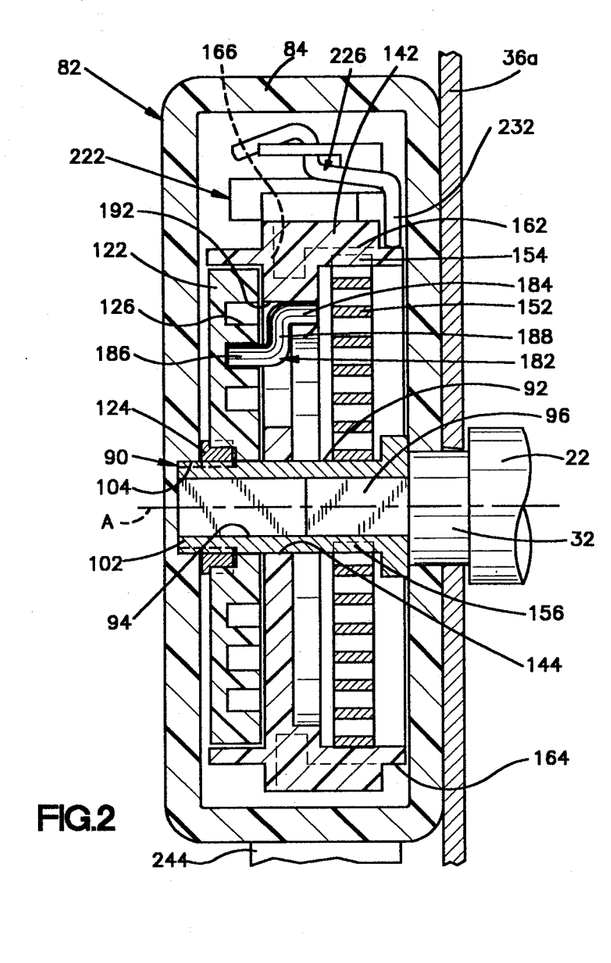
FIG. 2 is an enlarged cross sectional view of the comfort mechanism in the retractor of FIG. 1.

The retractor 20 also includes a comfort mechanism 82. The comfort mechanism 82 is located within a housing 84 (FIG. 2) connected to the frame side 36a of the retractor 20. When actuated, the comfort mechanism 82 blocks rotation of the spindle 22 in the belt retraction direction 46 so the belt webbing 44 is not pulled against the occupant by the biasing force exerted by the wind-up spring 52.

The comfort mechanism 82 includes an extension shaft 90 (FIG. 2) which is connected to the stub shaft 32. The extension shaft 90 has a cylindrical outer surface 92 and an axially extending square bore 94. The square bore 94 receives a square projection 96 extending from the end of the stub shaft 32 to rotate the extension shaft 90 with the spindle 22. An end portion 102 of the extension shaft 90 is received in an opening 104 formed in the housing 84. A disk 122 is fixed to the extension shaft 90 by a cap 124 keyed to the spindle 22. The disk 122, thus, rotates with the spindle 22. A spiral groove 126 is located in an axial end surface of the disk 122 which faces the retractor 20.

Figure 3:
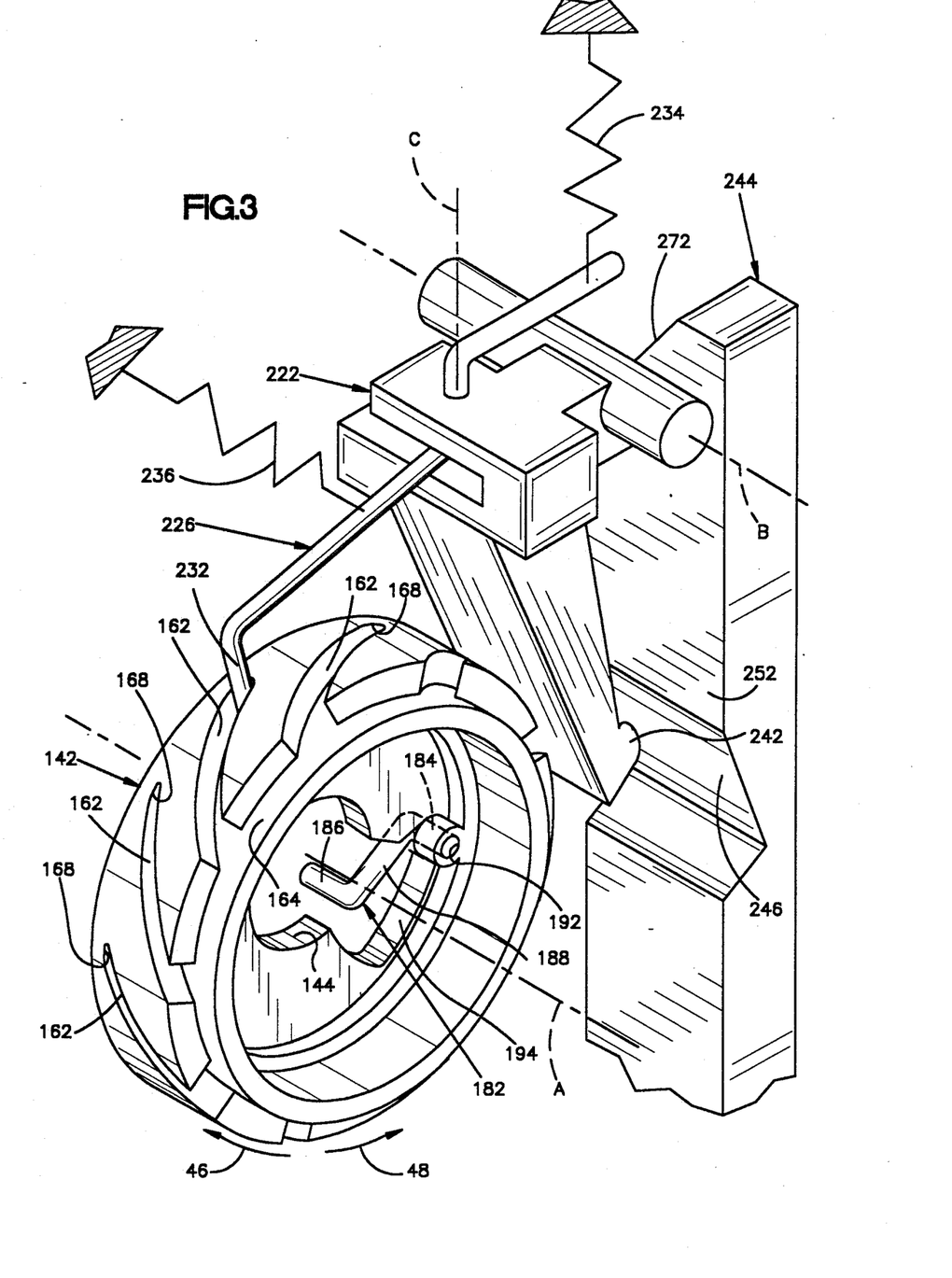
FIG. 3 is a perspective view of a portion of the comfort mechanism illustrated in FIG. 1.

The comfort mechanism 82 also includes a drum 142 (FIG. 3). The extension shaft 90 extends through a centrally located opening 144 in the drum 142. The opening 144 in the drum 142 is sized to circumferentially engage a portion of the outer surface 92 of the extension shaft 90 to support the drum for rotation. A spiral coil spring 152 (FIG. 2) is connected at one end 154 to the drum 142 and at another end 156 to the extension shaft 90. The spring 152 biases the drum 142 to rotate in the belt withdrawal direction 48 relative to the extension shaft 90 to an initial position relative to the extension shaft and spindle 22.

A plurality of parallel grooves 162 (FIG. 3) are formed in and are spaced equally about the outer circumference of the drum 142. Each groove 162 extends at an acute angle relative to the longitudinal central axis A of the drum 142. The length of each groove 162 is greater than the width of the drum 142 taken in a direction parallel to the longitudinal central axis A of the drum. A recessed track 164 is located adjacent an axial end of the drum 142 which faces the retractor 20. The grooves 162 are open at one end to the track 164. A respective opening 166 (FIGS. 5 and 13) is located at the other end 168 (FIGS. 3 and 5) of each groove 162 away from the track 164.

A follower 182 (FIGS. 2 and 3) has end portions 184, 186 extending transversely from an intermediate connecting portion 188. The follower 182 connects the drum 142 with the disk 122. The end portion 184 of the follower 182 is received in a bore 192 in the drum 142 to support the follower for pivotal movement relative to the drum. The end portion 186 of the follower 182 is received in the spiral groove 126 in the disk 122.

Figure 13:
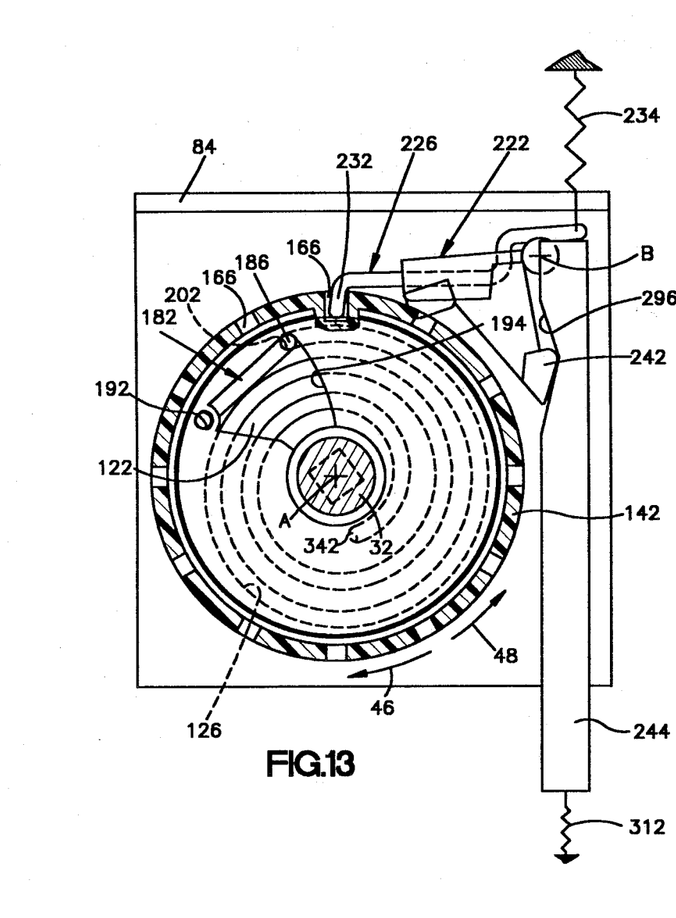
FIG. 13 is a view taken approximately along line 13—13 of FIG. 1.

The follower 182 pivots within an arcuate opening 194 (FIGS. 3 and 4) formed in the drum 142. When the end portion 186 of the follower 182 engages a radial outermost end 202 (best seen in FIG. 14) of the spiral groove 126, as illustrated in FIG. 13, the drum is blocked from rotating in the belt withdrawal direction 48 relative to the disk 122 and spindle 22. When the drum 142 is blocked from rotating and the disk 122 and spindle 22 rotate in the belt withdrawal direction 48 relative to a drum 142, the end portion 186 of the follower 182 moves radially inwardly along the spiral groove 126 in the disk 122 from the position illustrated in FIG. 13 toward the position illustrated in FIG. 14.

A pawl 222 (FIG. 3) is supported by the housing 84 for pivotal movement about an axis B. The comfort mechanism 82 is actuated and deactuated in response to pivotal movement of the pawl 222. The pawl 222 carries a locking arm 226. The locking arm 226 is pivotable in the pawl 222 about an axis C which extends transversely to the axis B. An end portion 232 of the locking arm 226 is biased in a direction toward engagement with the drum 142 by a spring 234 and toward the ends 168 of the grooves 162 by a spring 236. A cam 242 (FIGS. 3 and 4) extends from the pawl 222.

Figure 4:
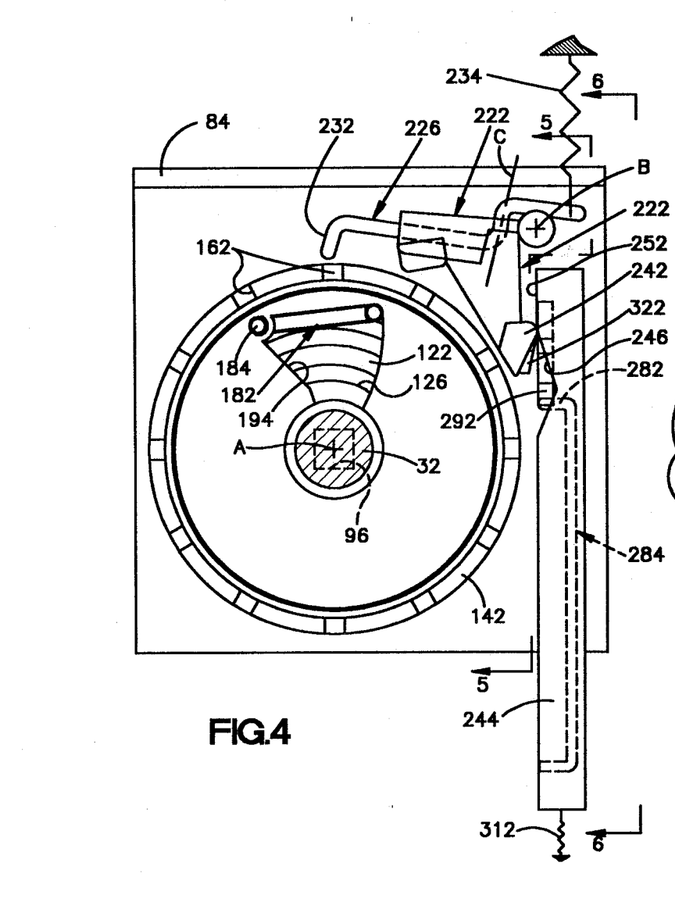
FIG. 4 is a view, partly in section, taken approximately along the line 4—4 of FIG. 1.

A link 244 is supported between the housing 84 and the frame 36 of the retractor 20 for reciprocating movement. The link 244 has a notch 246 facing the drum 142 adjacent the cam 242 on the pawl 222. When the comfort mechanism 82 is not actuated, the cam 242 on the pawl 222 rides along a planar surface 252 of the link 244 to maintain the end portion 232 of the locking arm 226 out of engagement with the drum 142, as illustrated in FIG. 4, against the bias of the spring 234. A link wire 284 is carried in an opening 286 in the link 244. The link wire 284 interacts with a cam 292 located on the housing 84 between the link 244 and the drum 142, as illustrated in FIG. 4, and with a retainer 322 located on the pawl 222 to control movement of the link 244.

To actuate the comfort mechanism 82, the link 244 is moved upwardly, as viewed in FIG. 4. The link 244 may be moved upwardly by manually depressing a lever (not shown) connected with the link or by actuating a solenoid (not shown). The solenoid can be energized in response to manually depressing a switch or in response to changing the position of a switch located in a seat belt buckle or in a seat back.

Figures 5, 6:
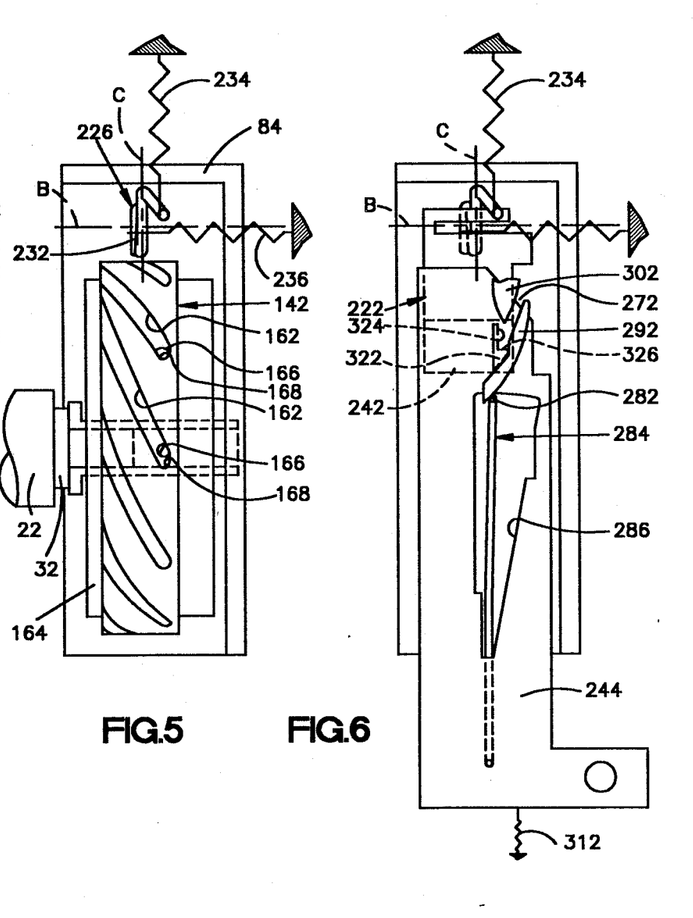
FIG. 5 is a view, with parts removed for clarity, of a portion of the comfort mechanism illustrated in FIG. 4, taken approximately along line 5—5 of FIG. 4.
FIG. 6 is a view of a portion of the comfort mechanism illustrated in FIG. 4, taken approximately along line 6—6 of FIG. 4.
Figure 7:
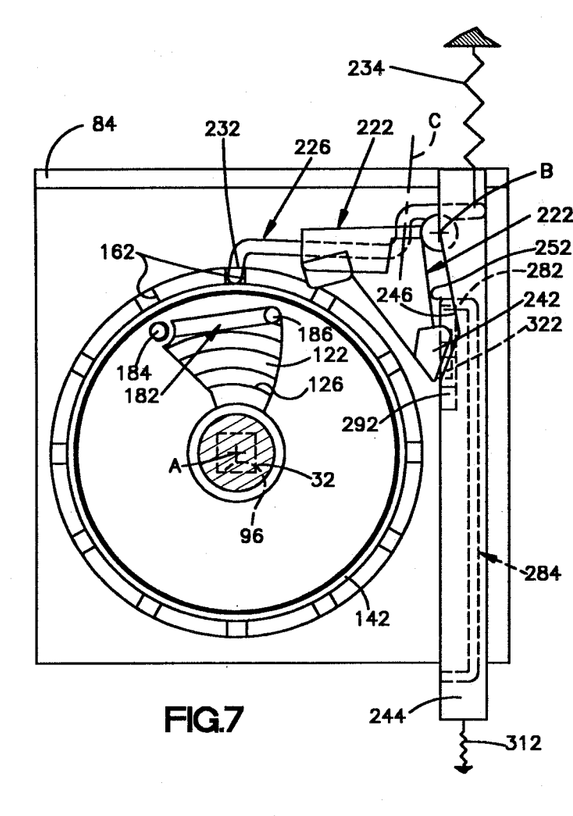
FIGS. 7 and 10 are views similar to FIG. 4 with parts in different positions.
Figure 8:
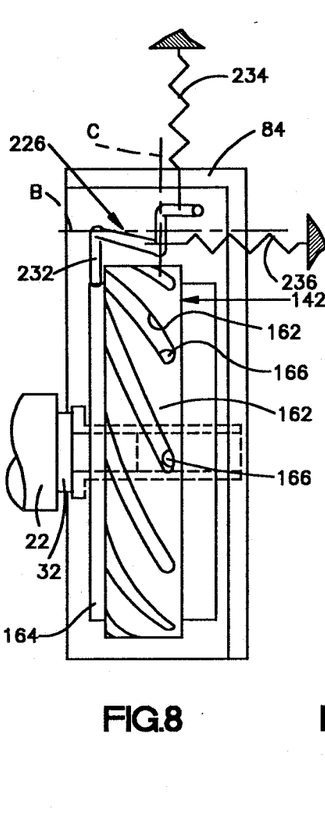
FIGS. 8 and 11 are views similar to FIG. 5 with parts in different positions.
Figure 9:
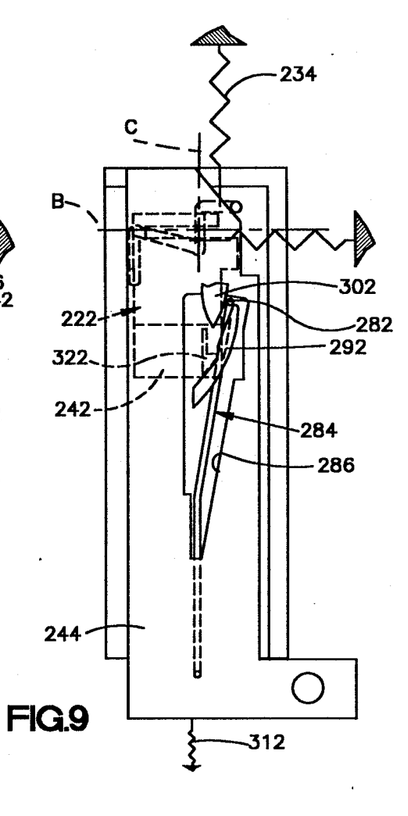
FIGS. 9 and 12 are views similar to FIG. 6 with parts in different positions.

Upon upward movement of the link 244, an inclined upper surface 272 (FIGS. 3 and 6) of the link forces the locking arm 226 to pivot about axis C so the end portion 232 moves in a direction toward the track 164, from the position illustrated in FIG. 5 toward the position illustrated in FIG. 8. During upward movement of the link 244, the cam 242 of the pawl 222 enters the notch 246 in the link 244, as illustrated in FIG. 7, and the pawl pivots counterclockwise, as viewed in FIG. 7, to allow the end portion 232 of the locking arm 226 to engage the outer circumference of the track 164 in the drum 142. An end portion 282 (FIG. 6) of the link wire 284 rides along the bottom surface of the cam 292. When the end portion 282 of the link wire 284 reaches the upper end of the cam 292, as illustrated in FIG. 9, the link wire attempts to spring back to its vertical position. However, the end portion 282 of the link wire 284 engages a blocking portion 302 of the housing 84, which prevents the end portion from moving any further to the left, as viewed in FIG. 9.

The link 244 is then pulled downwardly by the biasing force of a spring 312. The link wire 284 moves along a lower surface of the blocking portion 302 and engages the retainer 322 located on the pawl 222. The retainer 322 has a vertical surface 324 (FIG. 6) and a horizontal surface 326 which prevent the end portion 282 of the link wire 284 from moving further to the left, as viewed in FIG. 9, and thus, the link 244 from moving further downwardly.

If the occupant is not resting against the seat back when the link 244 is moved upwardly to actuate the comfort mechanism 82, the seat belt webbing 44 may be retracted under the bias of the wind-up spring 52 as the occupant moves against the seat back. The end portion 232 of the locking arm 226 ratchets over the grooves 162 as the drum 142 rotates in the belt retraction direction 46, because the grooves are oriented at an angle that prevents the end portion 232 from entering. Thus, an excessive amount of slack in the seat belt webbing 44 cannot be inadvertently established. The occupant then withdraws the seat belt webbing 44 from the retractor 20 to establish slack in the belt webbing. This can be done by manually pulling on the belt webbing 44 or by the occupant moving in a forward direction from the seat back. During withdrawal of the seat belt webbing 44, the drum 142 rotates with the spindle 22 in the belt withdrawal direction 48. The drum 142 rotates with the spindle 22 because when the end portion 186 of the follower engages the end 202 of the groove 126 in the disk 122, the follower 182 blocks the drum from rotating in the belt withdrawal direction relative to the disk 122 in response to the bias of the spring 152.

If the end portion 232 of the locking arm 226 is adjacent one of the grooves 162, as illustrated in FIG. 7, the end portion 232 will enter the groove due to bias of spring 236. If the end portion 232 is not adjacent one of the grooves 162, the drum 142 must rotate until the end portion 232 is adjacent one of the grooves 162 before the end portion 232 enters the groove. Once the end portion 232 is in one of the grooves 162, the end portion 232 travels along the length of the groove 162 during withdrawal of the belt webbing 44. When the end portion 232 engages the end surface 168 of the groove 162, rotation of the drum 142 is blocked in the belt withdrawal direction 48 at a predetermined angular position to limit the amount of slack which can be established in the belt webbing 44. The amount of rotation of the drum 142 in the belt withdrawal direction 48 after actuation of the comfort mechanism 82 preferably corresponds to not more than one inch of slack in the belt webbing 44. It will be apparent that the amount of slack which can be established in the belt webbing 44 can be varied by varying the distance between adjacent grooves 162 in the drum 142 and/or by varying the length of the grooves.

The end portion 232 of the locking arm 226 enters the opening 166 at the end of a groove 162 due to bias of the spring 234. Rotation of the drum 142 in either direction 46, 48 is blocked. The comfort mechanism 82 is actuated to maintain drum 142 at the angular position in which the slack was established in the belt webbing 44. The comforts mechanism 82 maintains the slack in the belt webbing 44 because the disk 122 and spindle 22 are blocked by the follower 182 from rotating in the belt retraction direction 46 relative to the drum 142 past the angular position at which the drum is blocked from rotating.

When the comfort mechanism 82 is actuated and slack in the belt webbing 44 is established, the drum 142 is blocked from rotating in the belt retraction direction 46 and the belt withdrawal direction 48. Any withdrawal of the belt webbing 44 which causes the spindle 22 and disk 122 to rotate in a belt withdrawal direction 48 causes the end 186 of the follower 182 to move radially inwardly in the spiral groove 126 in the disk toward the longitudinal central axis A of the spindle 22. This constitutes "memory" for the comfort mechanism 82 in which the belt webbing 44 can then be retracted to the position in which the slack in the belt webbing was established. When the belt webbing 44 is retracted after withdrawal in excess of the slack, the spindle 22 and disk 122 rotate in the belt retraction direction 46 and the end portion 186 of the follower 182 moves radially outwardly in the spiral groove 126 in the disk. When the end portion 186 of the follower 182 engages the outermost end 202 of the spiral groove 126, rotation of the disk 122 and spindle 22 is blocked again to prevent the force of the wind-up spring 52 from rotating the spindle 22 in the belt retraction direction 46 past the position in which the slack in the belt webbing 44 was established.

Figure 14:
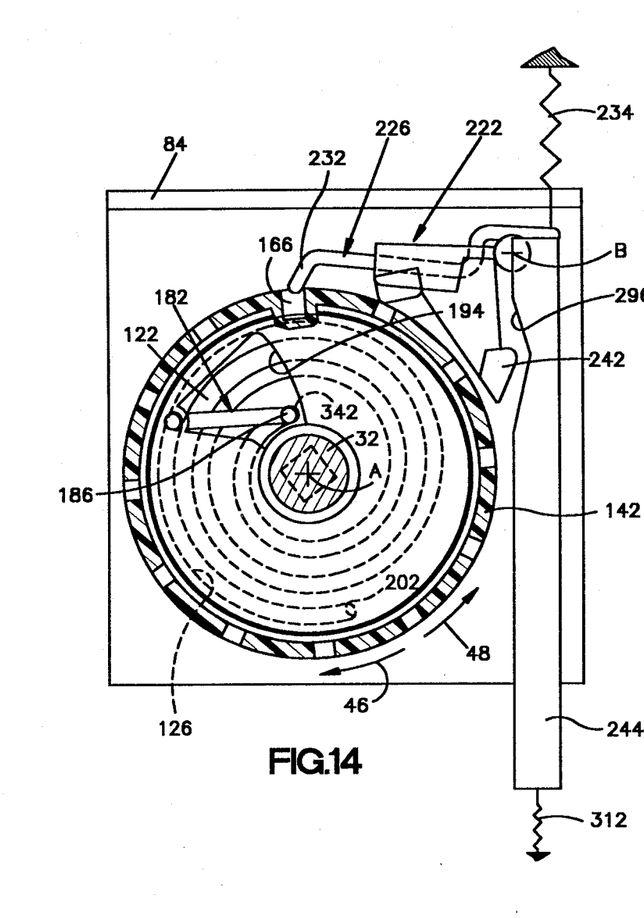
FIG. 14 is a view similar to FIG. 13 with parts in different positions.

When the amount of "memory" is exceeded during withdrawal of the belt webbing 44, the end portion 186 of the follower 182 engages an innermost end 342 (best seen in FIG. 13) of the spiral groove 126, as illustrated in FIG. 14, and the drum 142 is forced to rotate in the belt withdrawal direction 48. The end portion 232 of the locking arm 222 deflects and is pulled from the opening 166 at the end 168 of the groove 162 in the drum 142, as illustrated in FIG. 14. The drum 142 is no longer blocked from rotation and the comfort mechanism 82 is, thus, deactuated. The disk 122 and spindle 22 may rotate in the belt retraction direction 46 under the bias of the wind-up spring 52.

Figure 10:
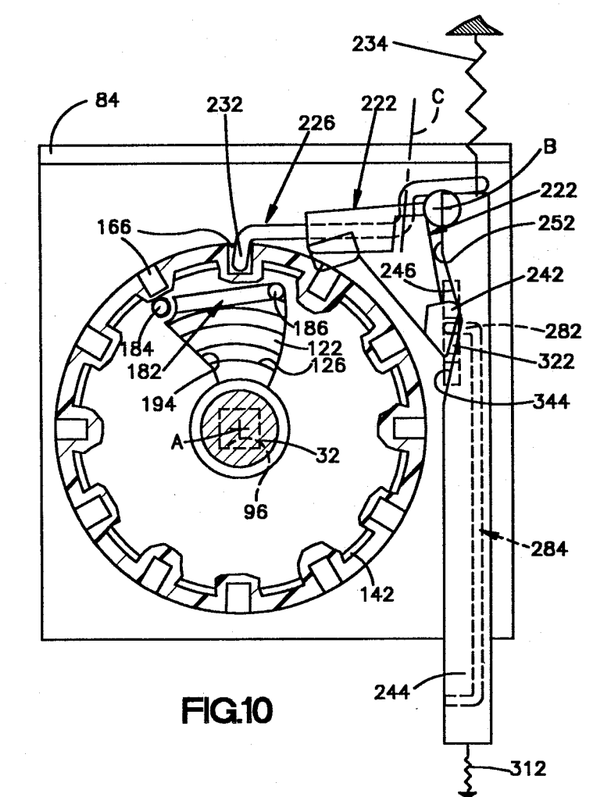
Figures 11, 12:
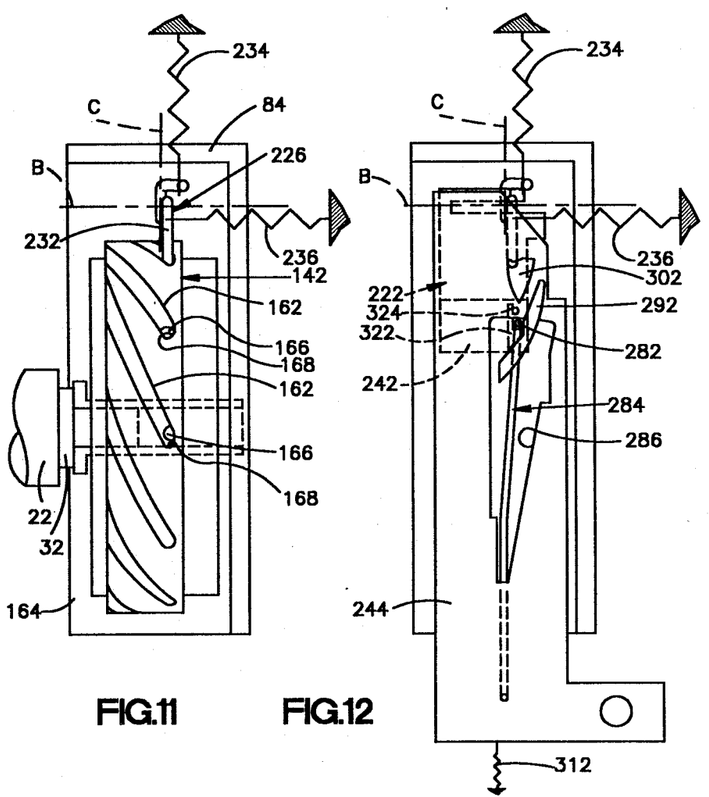

The comfort mechanism 82 may also be deactuated by moving the link 244 upwardly from the position illustrated in FIGS. 7 and 10, so the cam 242 on the pawl 222 engages another surface 344 (FIG. 10) of the notch 246 to pivot the pawl clockwise, as viewed in FIG. 14. Upon clockwise pivotal movement of the pawl 222, the retainer 322 on the pawl is pulled from engagement with the end portion 282 of the link wire 284. The link 244 is free to move downwardly under the bias of spring 312. The planar surface 252 of the link 244 pivots the pawl clockwise and the end portion 232 of the locking arm 226 is moved out of engagement with the opening 166. The spindle 22 is, thus, free to rotate in the belt retraction direction 46 under the bias of the wind-up spring 52.

From the above description of a preferred embodiment of the invention, those skilled in the art will perceive improvements, changes and modifications in the invention. Such improvements, changes and modifications within the skill of the art are intended to be covered by the appended claims.

Having described a preferred embodiment of the present invention, we claim:

1. An apparatus comprising:
   a spindle having belt webbing wound thereon, said spindle being supported for rotation in belt retraction and belt withdrawal directions;
   means for biasing said spindle to rotate in the belt retraction direction;
   a first member fixed to said spindle for rotation with said spindle;
   a rotatable second member located adjacent said first member and rotatable with said spindle in the belt withdrawal direction; and
   actuatable means which, after actuation, stops rotation of said second member in the belt withdrawal direction at a predetermined angular position to limit the amount of slack which can be established in the belt and for thereafter blocking rotation of said second member in the belt withdrawal and belt retraction directions and enabling rotation of said spindle and first member in the belt withdrawal direction relative to said second member from said angular position;
   said actuatable means including a third member attached to said second member and engageable with a stop portion of said first member to prevent rotation of said first member and said spindle in the belt retraction direction past said angular position when said second member is blocked from rotating by said actuatable means.

2. The apparatus set forth in claim 1 wherein said second member comprises a drum including a cylindrical outer surface located coaxially of said spindle, and wherein said actuatable means further includes:
   first surface means defining a first groove located in the outer surface of said drum, said first groove extending transversely relative to the longitudinal central axis of said drum; and
   a locking arm having a portion movable into engagement with the outer surface of said drum and receivable in said first groove, said portion of said locking arm being engageable with a surface defining an end of said first groove to limit rotation of said drum in the belt withdrawal direction.

3. The apparatus set forth in claim 2 wherein said first member comprises a disk located coaxially within said drum and includes surface means defining a spiral groove located in an axial end surface of said disk; and
   said third member being pivotally supported by said drum and having a portion receivable in said spiral groove, said portion of said third member being engageable with a surface defining an end of said spiral groove to block rotation of said disk and said spindle in the belt retraction direction relative to said drum.

4. The apparatus set forth in claim 3 further including a spring connected between said spindle and said drum for biasing said drum to rotate in the belt withdrawal direction relative to said spindle so said portion of said third member engages said surface defining the end of said spiral groove in said disk.

5. The apparatus set forth in claim 3 further including second surface means defining an opening in said drum for receiving said portion of said locking arm to block rotation of said drum in the belt withdrawal and belt retraction directions, said second surface means defining the opening in said drum being located in said first groove adjacent said surface defining the end of said first groove.

6. The apparatus set forth in claim 5 further including a second surface defining another end of said spiral groove in said disk and means for moving said portion of said locking arm out of the opening in said drum when said portion of said third member engages said second surface during rotation of said spindle in the belt withdrawal direction.

7. The apparatus set forth in claim 2 further including supporting means supporting said locking arm for pivotal movement, a link including third surface means defining a notch and being movable from a first position to a second position to actuate said actuatable means, and a cam located on said supporting means and being receivable in said notch in said link when said link moves to its second position to allow said locking arm to pivot to a position in which said portion of said locking arm engages said outer surface of said drum.

8. The apparatus set forth in claim 7 further including a link wire carried by said link and means on said supporting means for receiving an end portion of said link wire to block movement of said link from its second position when said cam is received in said notch in said link.

9. An apparatus comprising:
   a spindle having belt webbing wound thereon, said spindle being supported for rotation in belt retraction and belt withdrawal directions;
   a first member fixed to said spindle to rotate with said spindle;
   a rotatable second member adjacent said first member;
   an interconnecting member associated with said first member and said second member to effect rotation of the second member with the first member in the belt retraction direction; and
   a selectively actuatable lock mechanism for when actuated limiting rotation of said second member in the belt withdrawal direction to a predetermined amount and thereafter preventing rotation of the second member in the belt withdrawal and belt retraction directions;
   said interconnecting member being attached to said second member and engageable with a stop portion on said first member to block rotation of said first member and spindle in the belt retraction direction when said second member is blocked from rotating by said lock mechanism.

10. The apparatus set forth in claim 9 further including surface means defining a first groove in the periphery of said second member, said first groove extending at an acute angle relative to the longitudinal central axis of said second member, and wherein said lock mechanism includes a movable locking arm having a portion receivable in said first groove and engageable with a surface defining an end of said first groove to limit rotation of said second member in the belt withdrawal direction.

11. The apparatus set forth in claim 9 further including means for permitting rotation of said first member and said spindle in the belt withdrawal direction relative to said second member from a first position to a second position when said second member is blocked from rotating.

12. The apparatus set forth in 11 wherein said second member comprises a drum having a cylindrical outer surface and said first member is a disk located coaxially within said drum, said means for permitting rotation of said first member and said spindle in the belt withdrawal direction relative to said drum comprising surface means defining a spiral groove located in said disk and said interconnecting member being a follower pivotally supported by said drum and having a portion receivable in said spiral groove, said portion of said follower being engageable with a surface defining an end of said spiral groove to block rotation of said disk and said spindle in the belt retraction direction relative to said drum.

13. The apparatus set forth in claim 12 further including a spring connected between said spindle and said drum for biasing said drum to rotate in the belt withdrawal direction relative to said disk and said spindle so said portion of said follower engages said surface defining said end of said spiral groove in said disk.

14. The apparatus set forth in claim 12 further including surface means defining an opening in said drum for receiving said portion of said movable locking arm to block rotation of said drum in the belt retraction and withdrawal directions, said surface means defining the opening in said drum being located in said first groove in said drum adjacent said surface defining the end of said first groove.

15. The apparatus set forth in claim 14 further including a second surface defining another end of said spiral groove in said disk and means for moving said portion of said locking arm out of the opening in said drum when said follower engages said second surface of said disk member during rotation of said disk and said spindle in the belt withdrawal direction.

16. The apparatus set forth in claim 10 further including supporting means for pivotally supporting said locking arm, a link having surface means defining a notch and being movable from a first position to a second position for actuating said lock mechanism, and a cam on said supporting means receivable in said notch in said link when said link moves to its second position to allow said locking arm to pivot to a position in which said portion of said locking arm engages the periphery of said drum.

17. The apparatus set forth in claim 16 further including a link wire carried by said link and means on said supporting means for receiving a portion of said link wire to block movement of said link from its second position when said cam is received in said notch in said link.

18. An apparatus comprising:
a spindle having belt webbing wound thereon, said spindle being supported for rotation in belt retraction and belt withdrawal directions;
means for biasing said spindle to rotate in the belt retraction direction;
a disk member fixed to said spindle to rotate with said spindle;
a rotatable drum member adjacent said disk member;
a lever associated with the disk member and said drum member to effect rotation of said drum member with said disk member in the belt retraction direction; and
a selectively actuatable lock mechanism for after actuation limiting rotation of said drum member in the belt withdrawal direction to a predetermined amount and thereafter preventing rotation of said drum member in the belt withdrawal and belt retraction directions;
said lever being attached to said drum and engageable with a stop portion of said disk to prevent rotation of said disk and spindle in a belt retraction direction when said drum is blocked from rotating by said lock mechanism.

* * * * *